J. A. HAFNER.

MECHANICAL MOVEMENT.

No. 10,206. Reissued Sept. 26, 1882.

Witnesses.
W. B. Corwin
R. C. Winshall

Inventor.
John A. Hafner
by his attys
Bakewell & Kerr

N. PETERS, Photo-Lithographer, Washington, D. C.

UNITED STATES PATENT OFFICE.

JOHN A. HAFNER, OF PITTSBURG, PENNSYLVANIA.

MECHANICAL MOVEMENT.

SPECIFICATION forming part of Reissued Letters Patent No. 10,206, dated September 26, 1882.

Original No. 260,387, dated July 4, 1882. Application for reissue filed August 30, 1882.

*To all whom it may concern:*

Be it known that I, JOHN A. HAFNER, of Pittsburg, in the county of Allegheny and State of Pennsylvania, have invented a new and useful Improvement in Mechanical Movements; and I do hereby declare the following to be a full, clear, and exact description thereof, reference being had to the accompanying drawings, forming part of this specification, in which—

Figure 1:
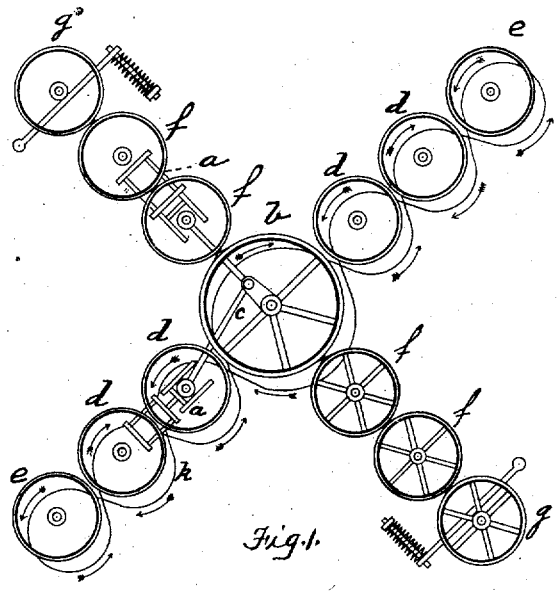
Figure 2:
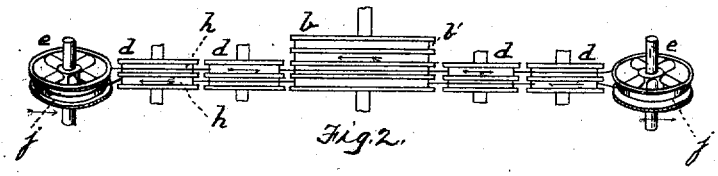
Figure 3:
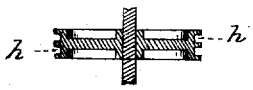

Figure 1 is a plan view of a series of pulleys, showing my invention, the belt being thrown off the pulleys. Fig. 2 is a side elevation of the same, and Fig. 3 is a sectional view of one of the pulleys.

Like letters of reference indicate like parts wherever they occur.

My invention relates to an improved mechanical movement; and it has for its object economy of power, economy of space, and economy of machinery; and it consists in the construction and arrangement of a series of pulleys and belt, whereby the side pull is obviated, the friction is lessened, and the power is retained.

I will now describe my invention, so that others skilled in the art may manufacture and use the same.

In the drawings, *a* represents the engines, which drive the drive-pulley *b* by means of the cranks *c*. The face of the drive-pulley *b* is provided with four parallel grooves, *b'*.

Extending from, in a straight line, and on the same plane with, the two lower grooves of the pulley *b* is a series of pulley-wheels, *d*, at each end of which (the driving-pulley *b* being in the middle) is a guide and tightening-wheel, *e*, which is on an incline with the plane of the pulley-wheels.

At right angles to the line of the series of pulley-wheels *d* is a similar series of pulley-wheels, *f*, on the same plane as the two upper grooves on the driving-pulley *b*.

At each end of the series of pulley-wheels *f* is an inclined guide and tightening-wheel, *g*, similar to the wheels *e*. The center of these guide-wheels *e* and *g* is on the same plane as the center of the pulley-wheels.

The pulley-wheels *d* and *f* are attached to shafts set in suitable bearings and connected with the machinery. On the face of each of these pulley-wheels are two parallel belt-grooves, *h*, while on the face of the inclined tightening-wheels *e* and *g* there is but a single belt-groove, *j*. These tightening-wheels are set in movable bearings and provided with springs and levers, so as to hold the belt taut. Each of these series of pulleys is provided with but a single endless belt, *k*, which passes from the two inclined guides and tightening-wheels of the series in the lower set of grooves on alternate sides of each pulley-wheel, and returns on the upper set of grooves (its course being changed by the inclined guide-wheels) on alternate sides of the pulley-wheels—that is, the belt passes from one of the inclined guides and tightening-wheels to the opposite side in the lower groove of the first pulley-wheel. Then, still remaining in the lower groove, the band crosses to the other side of the next pulley, and so on, passing the driving-pulley in the same manner, until it comes to the second guide-wheel at the other end of the series, which, owing to its being inclined, throws the band into the upper groove on the other side of the pulley-wheel, and so on until the band returns to the first guide-wheel, where, owing to the inclination of the guide-wheel, it is again thrown into the lower groove. The operation of the other series of pulleys is the same, the belt moving in the remaining two grooves of the drive-pulley.

Although I have described a certain arrangement of my invention, I do not desire to limit myself to the same, as the number of pulley-wheels may be changed, or the number of series, and also the position of the driving-pulley; but at both ends of each series of pulleys there must be a guide and tightening-wheel in order to guide the direction of the belt and hold it taut by the adjustable spring (or its equivalent) connection of the bearing of the wheels. Nor do I confine myself to the kind or method of applying the power to the drive-wheel. Instead of grooves on the pulleys, guide-rollers or other means may be used to keep the band at its proper level.

By my invention all the advantages aforementioned are obtained.

Having thus described my invention, what I claim, and desire to secure by Letters Patent, is—

1. A mechanical movement consisting of a drive-pulley, guide-wheels with their axes inclined to the axis of the drive-pulley, and a series of working-pulleys intermediate between the drive-pulley and guide-pulleys, the whole being connected by an endless belt running on alternate sides of the pulleys, substantially as described.

2. A mechanical movement consisting of a drive-pulley and adjustable guide-wheels with their axes inclined to the axis of the drive-pulley, and a series of working-pulleys intermediate between the drive-pulley and guide-pulleys, the whole being connected by an endless belt running on alternate sides of the pulleys, substantially as described.

3. A mechanical movement consisting of a drive-pulley, adjustable guide-wheels with elastically-journaled bearings with their axes inclined to the axis of the drive-pulley, and a series of working-pulleys intermediate between the drive-pulley and guide-pulleys, the whole being connected by an endless belt running on alternate sides of the pulleys, substantially as described.

In witness whereof I have hereunto set my hand.

JNO. A. HAFNER.

Witnesses:
JAMES K. BAKEWELL,
JOHN S. KENNEDY.